United States Patent
Seiss et al.

(10) Patent No.: US 12,227,330 B2
(45) Date of Patent: Feb. 18, 2025

(54) MOLDED COLLECTION BASKET

(71) Applicant: Electrolux Professional, Inc., Vicksburg, MS (US)

(72) Inventors: Richard Seiss, Madison, MS (US); Roger Moore, Brandon, MS (US); Michael P. Licata, Lee's Summit, MO (US)

(73) Assignee: ELECTROLUX PROFESSIONAL, INC., Vicksburg, MS (US)

( * ) Notice: Subject to any disclaimer, the term of this patent is extended or adjusted under 35 U.S.C. 154(b) by 142 days.

(21) Appl. No.: 17/590,137

(22) Filed: Feb. 1, 2022

(65) Prior Publication Data
US 2022/0242606 A1 Aug. 4, 2022

Related U.S. Application Data

(63) Continuation-in-part of application No. 29/768,748, filed on Feb. 1, 2021, now Pat. No. Des. 1,038,714.
(Continued)

(51) Int. Cl.
*B65D 25/28* (2006.01)
*B29D 22/00* (2006.01)
(Continued)

(52) U.S. Cl.
CPC ............ *B65D 1/38* (2013.01); *B29D 22/003* (2013.01); *B65D 25/2867* (2013.01); *B29K 2081/06* (2013.01)

(58) Field of Classification Search
CPC .. B65D 1/38; B65D 25/2867; B65D 21/0209; B65D 25/0805; B65D 25/2808; B65D 25/2817; B65D 25/282
See application file for complete search history.

(56) References Cited

U.S. PATENT DOCUMENTS

D23,199 S 4/1894 Pickard
4,033,461 A 7/1977 Nevai
(Continued)

FOREIGN PATENT DOCUMENTS

CN 304825002 9/2018
CN 117202832 A 12/2023
(Continued)

OTHER PUBLICATIONS

"Non-Final Office Action Received for the U.S. Appl. No. 12/842,984, mailed on Apr. 22, 2013."
(Continued)

*Primary Examiner* — Stephen J Castellano
(74) *Attorney, Agent, or Firm* — Kutak Rock LLP

(57) ABSTRACT

A basket assembly is provided. The basket assembly includes a molded basket body having opposed side walls with minimal draft angles. The basket body defines a front opening for receiving fluid and items, an interior area of receiving and holding the items, and a plurality of perforations for allowing the fluid to escape the interior area while retaining the items within the interior area. The perforations are placed, oriented, sized, and configured to maximize fluid flow and item retention while the basket assembly is positioned in flowing fluid of a washing machine wash tank. Support pins retain the basket assembly at the top of the wash tank and handles extending therebetween facilitate removal of the basket assembly from the wash tank.

10 Claims, 8 Drawing Sheets

Related U.S. Application Data

(60) Provisional application No. 63/234,600, filed on Aug. 18, 2021.

(51) Int. Cl.
  *B65D 1/38* (2006.01)
  *B29K 81/00* (2006.01)

(56) References Cited

U.S. PATENT DOCUMENTS

| | | | |
|---|---|---|---|
| D254,529 S | 3/1980 | Arnoff | |
| D259,166 S | 5/1981 | Krusche | |
| D261,343 S | 10/1981 | Gibiec | |
| 4,685,481 A | 8/1987 | Carlson et al. | |
| 4,773,436 A | 9/1988 | Cantrell et al. | |
| D320,681 S | 10/1991 | Boula | |
| D336,698 S | 6/1993 | Conaway et al. | |
| 5,469,986 A * | 11/1995 | Jang | B65D 21/062 220/772 |
| 5,562,114 A | 10/1996 | Martin | |
| 6,000,094 A * | 12/1999 | Young | B01D 29/03 15/264 |
| D444,039 S | 6/2001 | Tong | |
| D503,313 S | 3/2005 | Shamoon | |
| D514,764 S | 2/2006 | Kumagai | |
| D545,060 S | 6/2007 | Cheng | |
| 7,780,036 B2 * | 8/2010 | Splain | A45C 13/26 206/505 |
| D628,861 S | 12/2010 | Lane | |
| 8,685,170 B2 | 4/2014 | Cantrell et al. | |
| D708,023 S | 7/2014 | Gast | |
| D762,065 S | 7/2016 | Hsu | |
| D855,991 S | 8/2019 | Hsu | |
| D910,260 S | 2/2021 | Xie | |
| D913,694 S | 3/2021 | Kraemer et al. | |
| D942,725 S | 2/2022 | Schlütter | |
| D963,341 S | 9/2022 | Kraemer | |
| D967,896 S | 10/2022 | Zhou | |
| D975,467 S | 1/2023 | Kraemer | |
| D978,533 S | 2/2023 | Dai | |
| D982,902 S | 4/2023 | Hsu | |
| D1,000,120 S | 10/2023 | Hsu | |
| D1,000,121 S | 10/2023 | Hsu | |
| 2003/0041886 A1 | 3/2003 | Cantrell et al. | |
| 2003/0041887 A1 | 3/2003 | Inch et al. | |
| 2004/0244822 A1 | 12/2004 | Cantrell et al. | |
| 2007/0241020 A1 * | 10/2007 | Anderson | B65D 25/2867 206/510 |
| 2011/0017241 A1 | 1/2011 | Cantrell et al. | |
| 2011/0174339 A1 | 7/2011 | Cantrell et al. | |
| 2011/0253648 A1 | 10/2011 | Clores | |
| 2020/0015654 A1 | 1/2020 | Buesing et al. | |

FOREIGN PATENT DOCUMENTS

| | | |
|---|---|---|
| DE | 202004017681 U1 | 9/2005 |
| KR | 20-19990011892 U | 3/1999 |
| KR | 10-20130077443 A | 7/2013 |
| WO | 2022165412 A1 | 8/2022 |

OTHER PUBLICATIONS

"Notice of Allowance received for U.S. Appl. No. 12/842,984, Mailed on Nov. 8, 2013."

"Restriction Requirement Received for U.S. Appl. No. 12/842,984, mailed on Sep. 27, 2012."

"Written Opinion of International Search Authority for PCT/US2010/043163, mailed Sep. 16, 2010".

"International Search Report and Written Opinion for International Application No. PCT/US2022/014719, Search completed on May 19, 2022 Mailed on May 20, 2022."

""DOITOOL Stainless Steel Utensil Holder", [Posted Online on amazon.com], [First Available Date Jan. 20, 2021], [Retrieved Online on Dec. 21, 2023], https://www.amazon.com/DOITOOL-Chopsticks-Stainless-Compartment-Restaurant/dp/ B08TG71 L39 (Year: 2021)".

""Power Prep", [Posted Online on unifiedbrands.net], [Wayback Machine Date Oct. 30, 2018], [Retrieved Online on Dec. 21, 2023], https://unifiedbrands.net/products/power-prep/ (Year: 2018)".

"Ex Parte Quayle Action Received For Design U.S. Appl. No. 29/768,748, mailed on Jan. 9, 2024".

"International Preliminary Report On Patentability Received For International Application No. PCT/US2022/014719 Report Issued On Jul. 31, 2023, Mailed On Aug. 10, 2023."

"Notice of Allowance received for Design U.S. Appl. No. 29/768,748, Mailed on Mar. 27, 2024."

\* cited by examiner

MOLDED COLLECTION BASKET

CROSS-REFERENCE TO RELATED APPLICATIONS

This application claims priority pursuant to 35 U.S.C. 119(e) to U.S. Provisional Patent Application Ser. No. 63/234,600, filed Aug. 18, 2021, and to U.S. Design patent application Ser. No. 29/768,748, filed Feb. 1, 2021, now U.S. Design Pat. No. D1,038,714, the entire disclosures of which is incorporated herein by reference.

FIELD OF THE INVENTION

The present invention relates generally to washing machines. More specifically, the present invention is concerned with a basket for removing items from a washing machine.

BACKGROUND

Continuous motion fluid machines often involve a large tank or basin in which fluid is circulated to provide a rolling action. One such machine is described in U.S. Pat. No. 4,773,436, the entire disclosure of which is incorporated herein by reference. The machine of the '436 patent includes a tank with multiple jets evenly spaced apart at an elevated position along the rear wall of the tank. The tank is filled with water (or wash fluid) to a level above the position of the jets. Pots and pans (or other items) are placed in the tank, and a pump is activated to draw fluid from within the tank and direct it through the jets to create a jet stream. Each jet directs its jet stream toward the bottom wall of the tank, the bottom wall then deflects the jet stream upward and towards the front wall of the tank. The front wall then deflects the upward moving jet stream towards the rear wall of the tank, and the rear wall deflects the jet stream downward and back towards the front wall along the bottom wall. The combination of deflections of the jet stream from the bottom, front and rear walls provides a rolling action within the tank.

With reference to a ware washing embodiment, the basic components of the wash tank of an exemplary pot and pan washing machine of the prior art are shown in FIG. 1. Wash tank 10 includes end walls 12 and 14, rear side wall 16, front side wall 18 and bottom wall 19. A pump can be attached to either end wall; in the embodiment shown in FIG. 1, pump 50 is attached to right end wall 14. An impeller located within pump 50 is driven by electric motor 56. In the embodiment shown in FIG. 1, the impeller draws fluid into pump inlet 52 through an intake port (not shown) located in end wall 14. The fluid is then discharged from the pump through pump outlet 54 and into outlet manifold 60. Outlet manifold 60 includes a ninety-degree turn, and several other turns, to direct the fluid across the back side of rear wall 16 and out jet nozzles 20 which are protruding through and extending from rear wall 16. The intake port associated with pump inlet 52 is covered by perforated (holes, voids, mesh, etc.) intake manifold 30. Intake manifold 30 includes handle 36 and is removably supported within wash tank 10 for easy cleaning. Intake manifold 30 fits tightly between outer runner 32 and inner runner 34, each of which extends vertically from bottom wall 19. Heating element 40 is positioned between intake manifold 30 and end wall 14 for its protection and to maximize the use of space.

Although the prior art pot and pan washing machine disclosed in U.S. Pat. No. 4,773,436 provides an exceptional circulating action, additional improvements have been made and continue to be made. For instance, the inventions disclosed in U.S. Pat. Nos. 6,739,348, 6,976,496, and 7,246,624 and U.S. Patent Publication No. 2003/0041886, the entire disclosures of which are incorporated herein by reference, provide components that greatly increase the overall efficiency and performance of the machine, including improvements to the intake and discharge manifolds, jets, pump, and system assembly methods. Additionally, the invention disclosed in U.S. Pat. No. 8,685,170, the entire disclosure of which is incorporated herein by reference, provides components and methods for washing produce (and other items). Furthermore, U.S. Pat. Nos. 7,523,757, 8,721,802, 8,882,929, 9,022,047, 9,027,575, 9,723,864, 9,427,131, 9,750,388, 10,028,636, and 10,292,562, and U.S. Patent Publication Nos. 2010/0012162, 2011/0120503 and 2011/0240061, 2014/0261821 and 2017/0224003, 2020/0108421, 2020/0261927, the entire disclosures of which are incorporated herein by reference, provide additional improvements for the operation of continuous motion style fluid circulating/washing machines.

Nevertheless, prior to the advent of the instant invention, the ability to collect and remove items from a fluid circulating style machine was limited. Existing collection baskets, such as the basket assembly disclosed in the '170 patent, include basket bodies that are made of cut, formed, and welded stainless steel sheet. Referring to FIG. 2, some basket assemblies 200 include sheet metal basket bodies having opposed first 212 and second 214 side walls and a plurality of walls extending therebetween, such as a rear wall 216, an intermediate angled wall 211, and a front wall 219, at least some of which include perforations that are punched into the sheet metal, as shown in more detail in FIG. 3.

Still referring to FIG. 2, the basket assembly 200 of the prior art defines a top opening 217 and front opening 218. The basket assembly further includes first 217a and second 217b handles and a plurality of support pins 220 for supporting the basket assembly 200 on one or more partition or wall of a wash tank, each such support pin 220 being displaced from each handle.

While presumably satisfactory for its intended purpose, the basket assembly of the '170 patent is not necessarily optimum in every situation. For instance, perforation patterns punched into walls of a sheet metal basket are not always the most efficient for fluid flow and tend to have burrs extending toward the inside of the basket, which can damage fragile food products (or other items), abrade the hands of the operator, and resist cleaning. Furthermore, edges of a sheet metal basket must be hemmed to prevent harm to operators, such as lacerations of an operator's hands. These hemmed edges, if not perfectly flattened, leave voids that can harbor food juices which can putrefy. Such voids can be difficult or impossible to clean. Accordingly, it would be beneficial to have a basket having perforation patterns that are efficient for fluid flow. It would further be beneficial to have a basket that can be formed easily and safely while eliminating or otherwise reducing burrs, voids, and other imperfections associated with sheet metal baskets.

As an additional matter, corners of a sheet metal basket tend to cause damage, such as to sink walls, a deck of the food washing machine, or any other surface such corners contact. Accordingly, it would be beneficial to have a basket that includes radiused corners, thereby reducing or eliminating damage to other surfaces.

Sheet metal baskets can be difficult to weld together, and welding tends to introduce disfiguring distortions. Accordingly, it would be beneficial to have a basket that does not require welding, thereby eliminating welding steps from the manufacturing process and further eliminating disfiguring distortions associated with welding.

A sheet metal basket can be time-consuming and expensive to manufacture, tying up manufacturing and financial resources that could be used elsewhere. Accordingly, it would be beneficial to have a basket that requires less manufacturing and financial resources than is required for a sheet metal basket, thereby presenting strategic advantages over a sheet metal basket.

A sheet metal basket is heavy, thereby reducing the food payload an operator can safely lift under existing regulations. Accordingly, it would be beneficial to have a basket that is formed from strong, light-weight materials, thereby increasing the food payload an operator can safely lift under existing regulations.

SUMMARY

The present invention comprises a device for collecting and removing items from within a fluid circulating style machine.

The present invention includes basket assemblies having perforation patterns that are efficient for fluid flow.

The present invention includes basket assemblies that can be formed easily and safely while eliminating or otherwise reducing burrs, voids, and other imperfections associated with sheet metal baskets.

The present invention includes radiused corners, thereby reducing or eliminating damage to surfaces, such as sink walls, decks for food washing machines, and the like.

The present invention does not require welding and associated steps, thereby eliminating disfiguring distortions associated with welding.

The present invention requires less manufacturing and financial resources than is required for a sheet metal basket, thereby presenting strategic advantages over a sheet metal basket.

The present invention is formed from strong, light-weight materials, thereby increasing the food payload an operator can safely lift under existing regulations.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
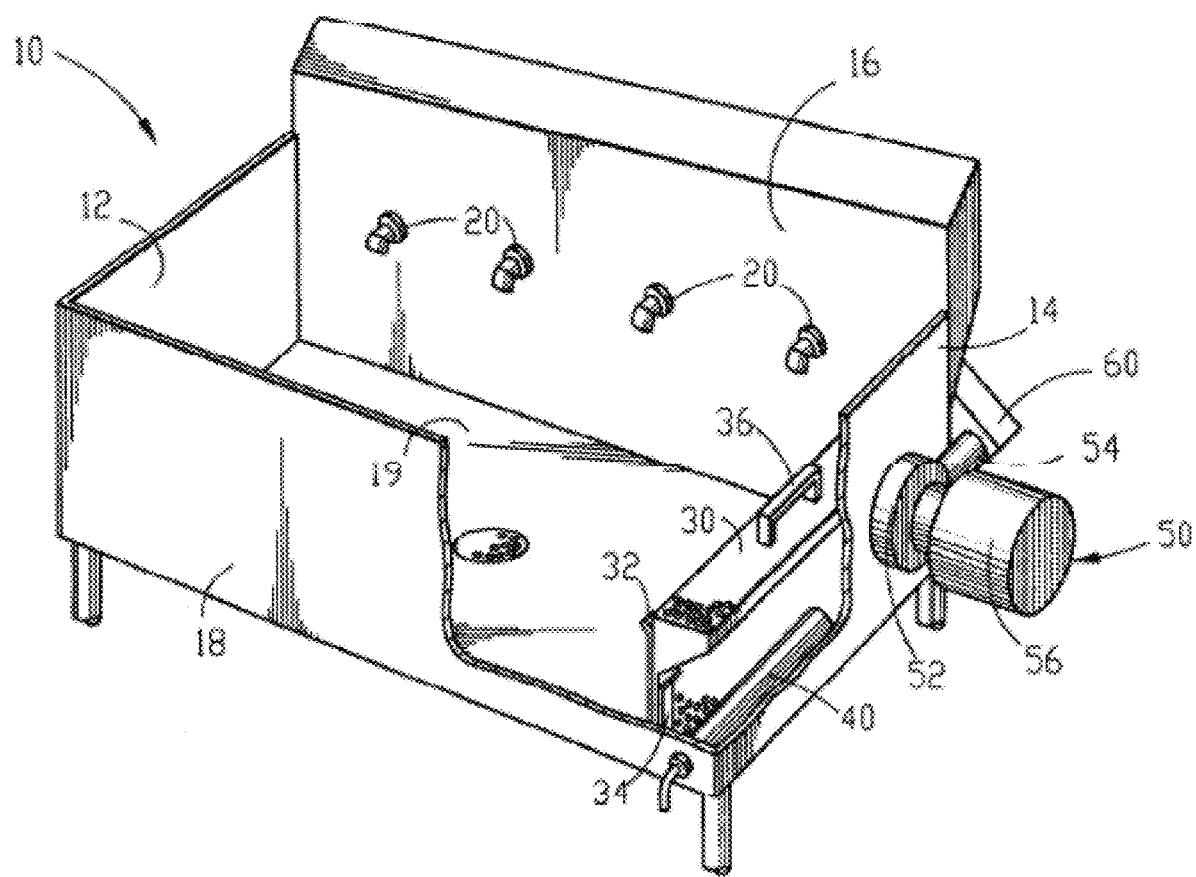
FIG. 1 is a partial perspective view of a continuous motion washing machine of the prior art.
Figure 2:
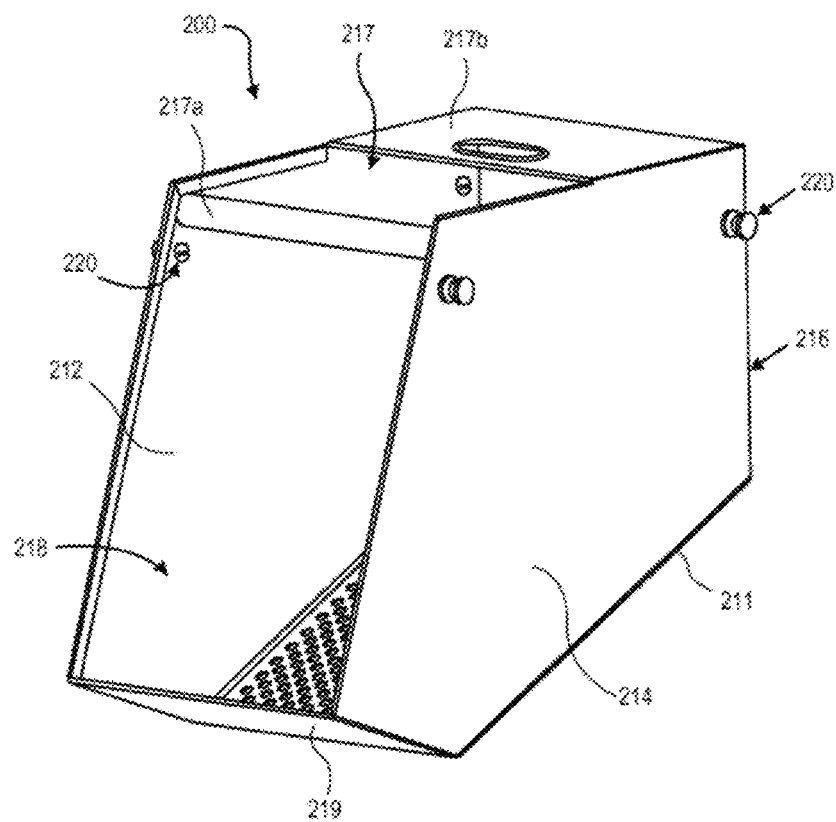
FIG. 2 is a perspective view of a basket assembly of the prior art, the basket assembly having a sheet metal basket body.
Figure 3:
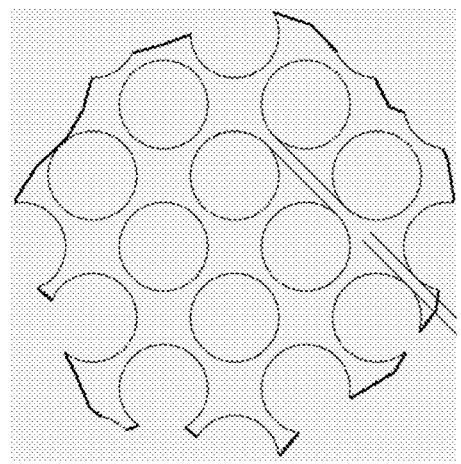
FIG. 3 is a partial view, shown in an enlarged scale, of a perforation pattern of the sheet metal basket body of the prior art.
Figure 4:
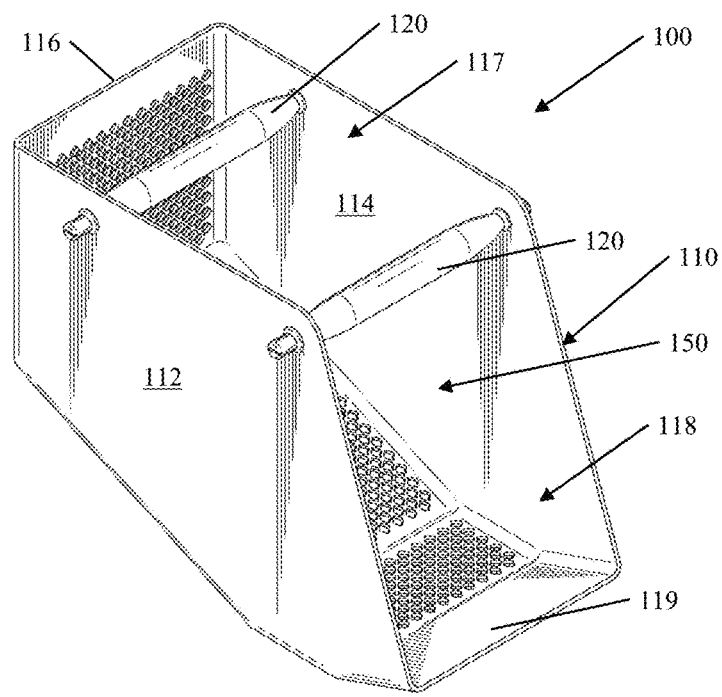
FIG. 4 is a perspective view of an embodiment of a basket assembly of the present invention, the basket assembly having a molded basket body.
Figure 5:
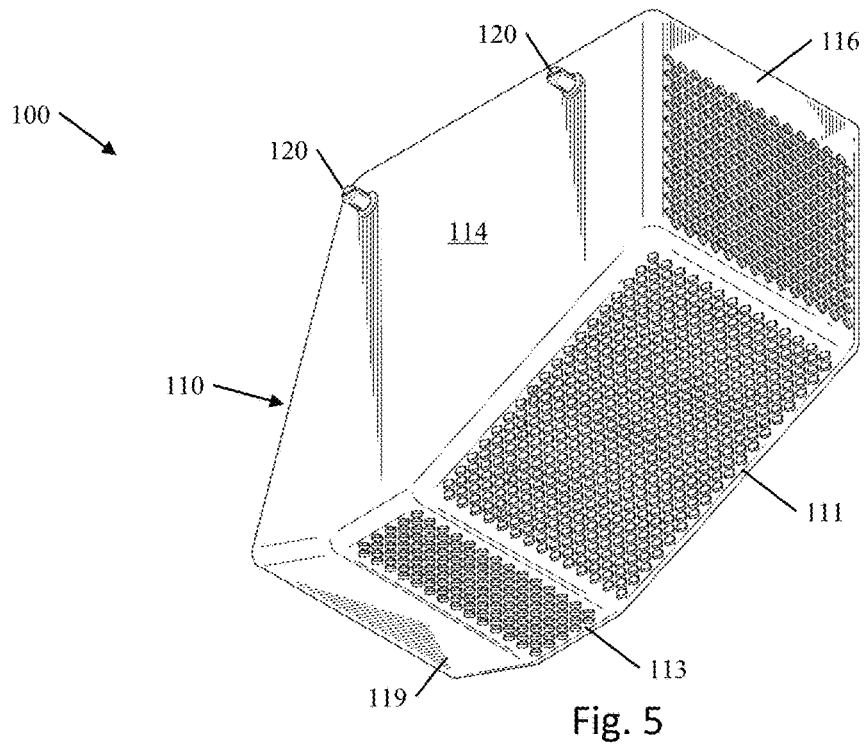
FIG. 5 is a perspective view of the basket assembly of FIG. 4, shown from a different angle.
Figure 6:
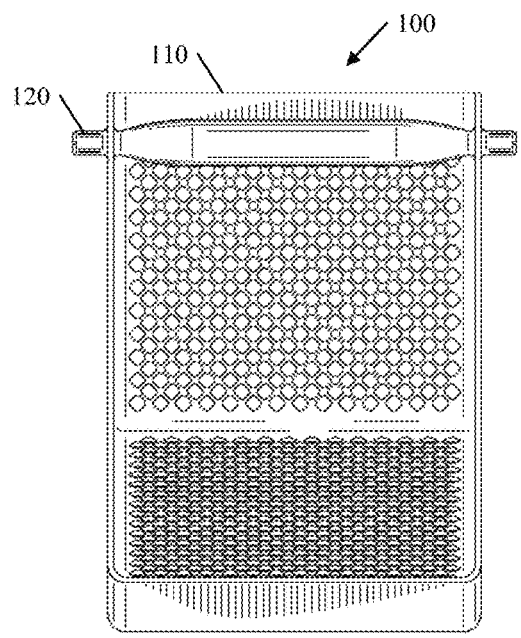
FIG. 6 is a front elevation view of the basket assembly of FIG. 4.
Figure 7:
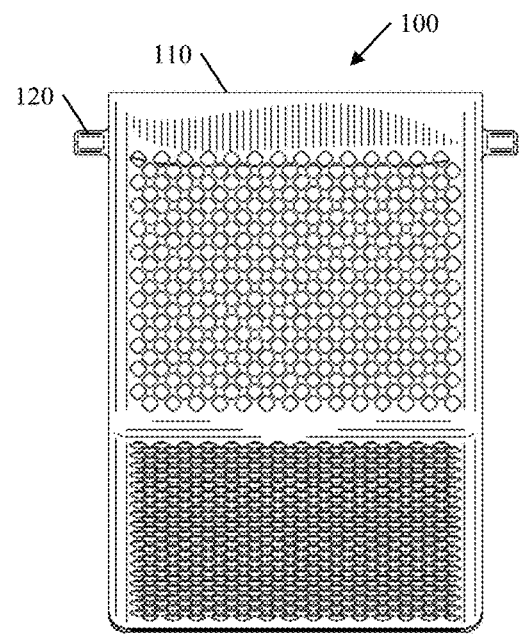
FIG. 7 is a rear elevation view of the basket assembly of FIG. 4.
Figure 8:
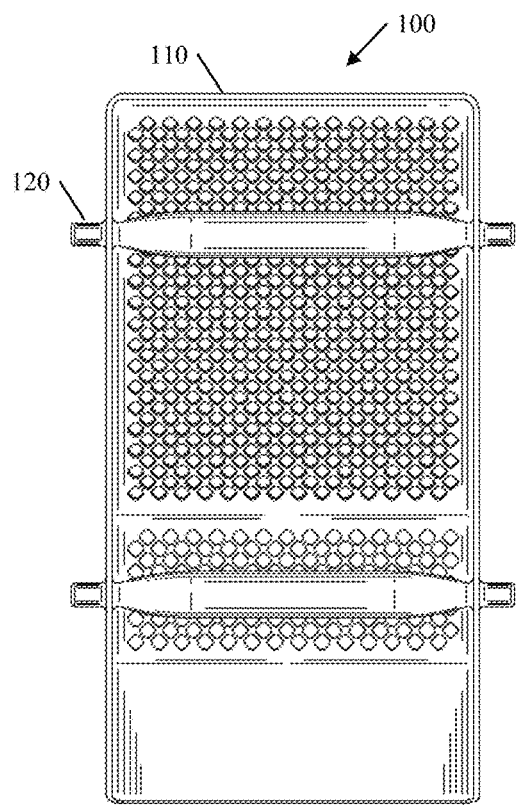
FIG. 8 is a top plan of the basket assembly of FIG. 4.
Figure 9:
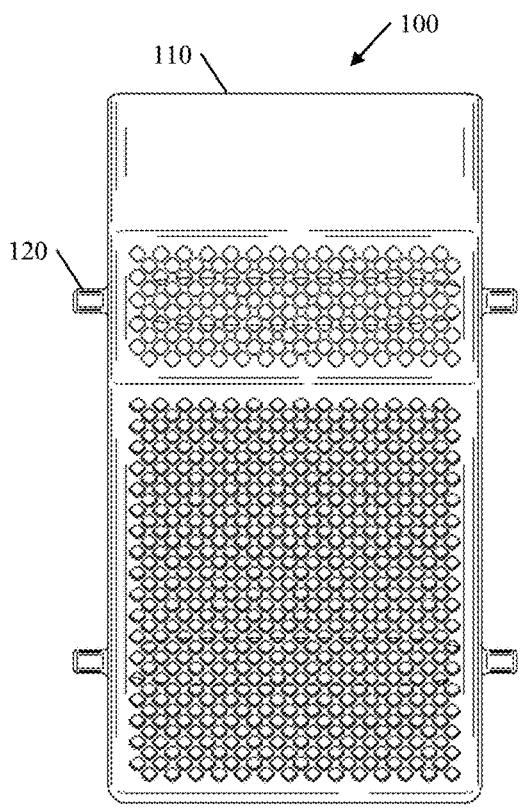
FIG. 9 is a bottom plan view of the basket assembly of FIG. 4.
Figure 10:
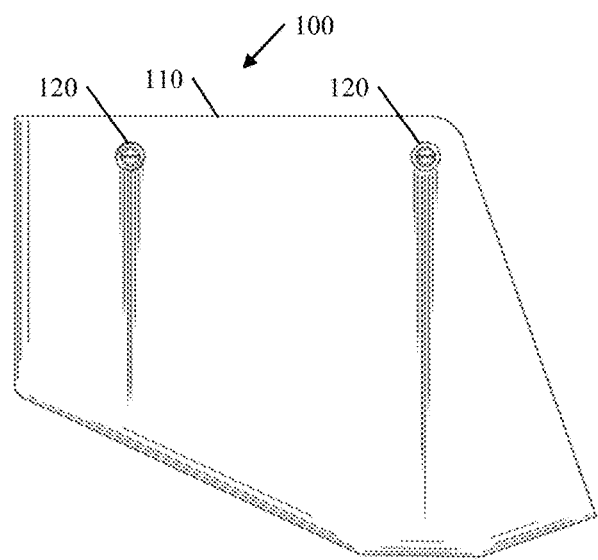
FIG. 10 is a side elevation view of the basket assembly of FIG. 4, the opposite side view being a mirror image thereof.

Referring to FIGS. 4 and 5, some basket assemblies 100 of the present invention include a basket body 110 defining a front opening 118 for receiving fluid and items and an interior area 150 for holding such items, thereby facilitating removal of such items from a wash tank 300 of a washing machine. In some embodiments, the basket body 110 includes opposed first 112 and second 114 side walls and a plurality of walls extending therebetween, thereby defining the interior area 150. In some embodiments, the plurality of walls extending between the side walls includes one or more of a rear wall 116, an intermediate angled wall 111, a bottom wall 113, and a front wall 119. In some embodiments, the basket body 110 includes a rear wall 116 extending along a rear edge of each side wall, an intermediate angled wall 111 extending from a bottom edge of the rear wall 116, a bottom wall 113 extending from a front edge of the intermediate angled wall 111, and a front wall 119 extending from the bottom wall 113 towards a front edge of each side wall. In some embodiments, the rear 116, intermediate angled 111, and bottom 113 walls are perforated, thereby allowing fluid to flow out of the interior area 150 of the basket assembly. In some embodiments, the front wall is angled in an upward direction, thereby assisting with item retention.

Still referring to FIGS. 4 and 5, some basket assemblies of the present invention include two handle assemblies 120, each handle assembly 120 extending between first 112 and second 114 side walls and being spaced apart so as to facilitate simultaneous use thereof, such as by allowing a user to use right and left hands to simultaneously interact with front and rear handle assemblies, respectively. In some embodiments, each handle assembly 120 is keyed to one or more side wall, thereby preventing or otherwise inhibiting rotation of the handle assembly. In some embodiments, each handle assembly 120 includes a handle member 122 having proximal and distal ends, each end of the handle member 122 defining an engagement feature 125, such as a lip and a boss extending therefrom. In some such embodiments, a lip of each engagement feature 125 is configured to engage with an inner surface of a respective side wall and a boss of each engagement feature 125 is configured to be received by a respective engagement aperture 115 of a respective side wall. In some embodiments one or more aperture and boss define corresponding shapes, such as a hexagonal shape, thereby facilitating keying of the handle assembly to the respective side wall.

The basket assembly 100 further includes a plurality of support pins 124, each support pin 124 extending from a respective side wall. In some embodiments, each support pin 124 further extends through each respective side wall and into engagement with a respective handle member 122, thereby forming a handle assembly 120 that is engaged with and secured to a basket body 110. In some embodiments, each support pin 124 defines a lip that is configured to engage with an outer surface of a respective side wall, such as to trap the side wall between such lip and a corresponding lip of the respective handle member 122.

Figure 11:
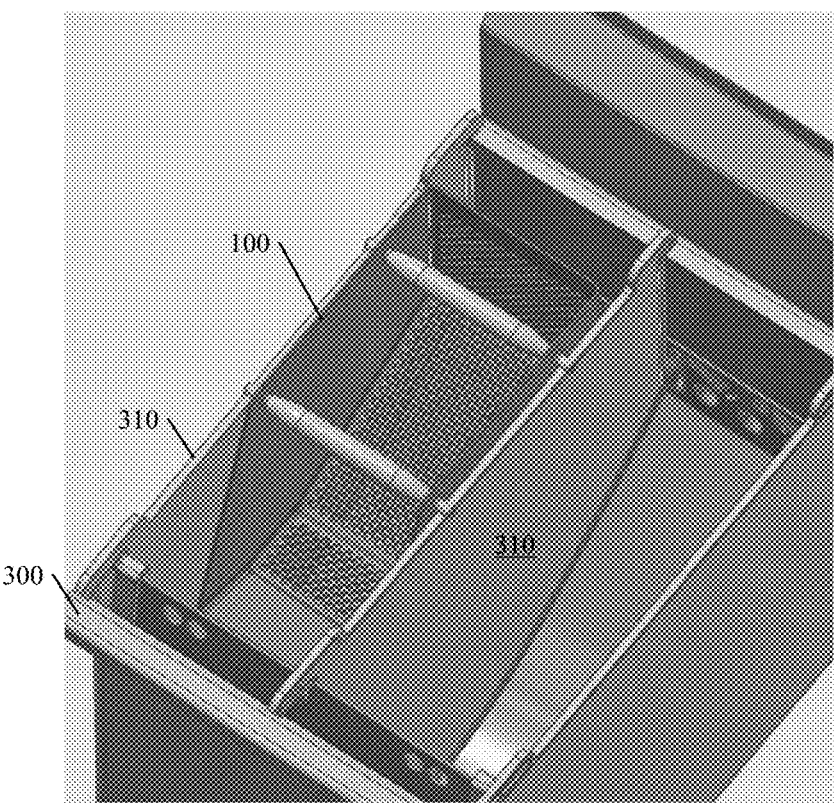
FIG. 11 is a partial perspective view of a wash tank shown with a plurality of partitions and a basket assembly positioned between two of the partitions.
Figure 12:
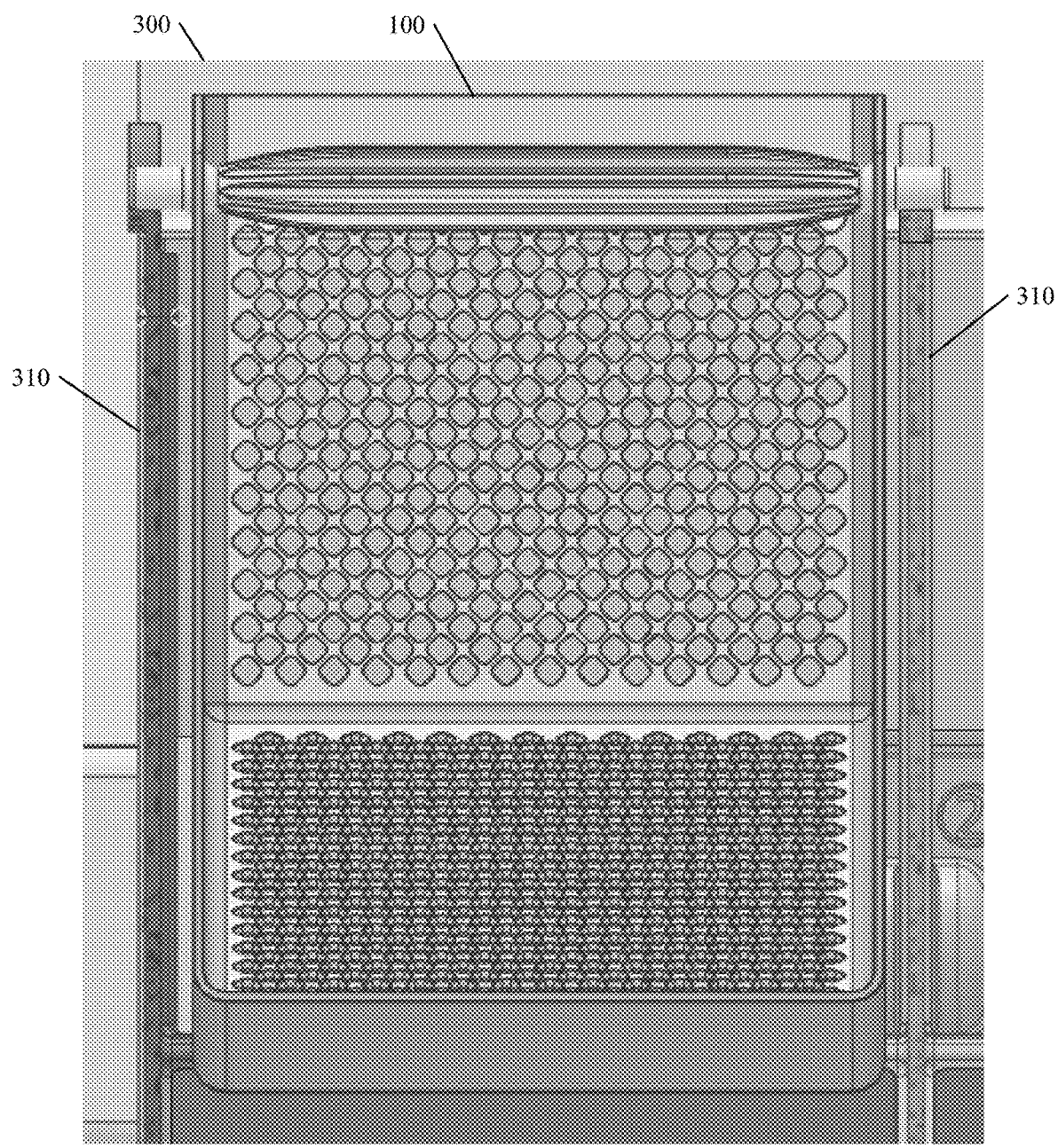
FIG. 12 is a front view of a basket assembly positioned between two partitions.
Figure 13:
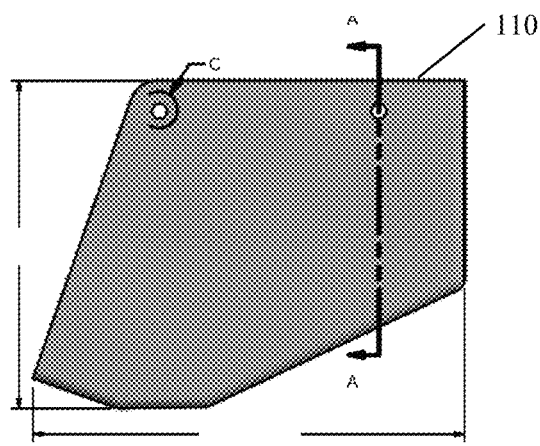
FIG. 13 is a side view of a molded basket body of the present invention.
Figure 14:
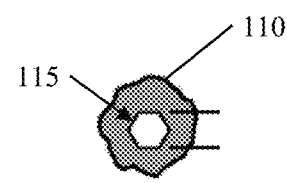
FIG. 14 is a partial view, shown in an enlarged scale, of a portion of a side wall of the molded basket body of FIG. 13, the portion of the side wall defining an aperture for engaging with a handle assembly of the present invention.
Figure 15:
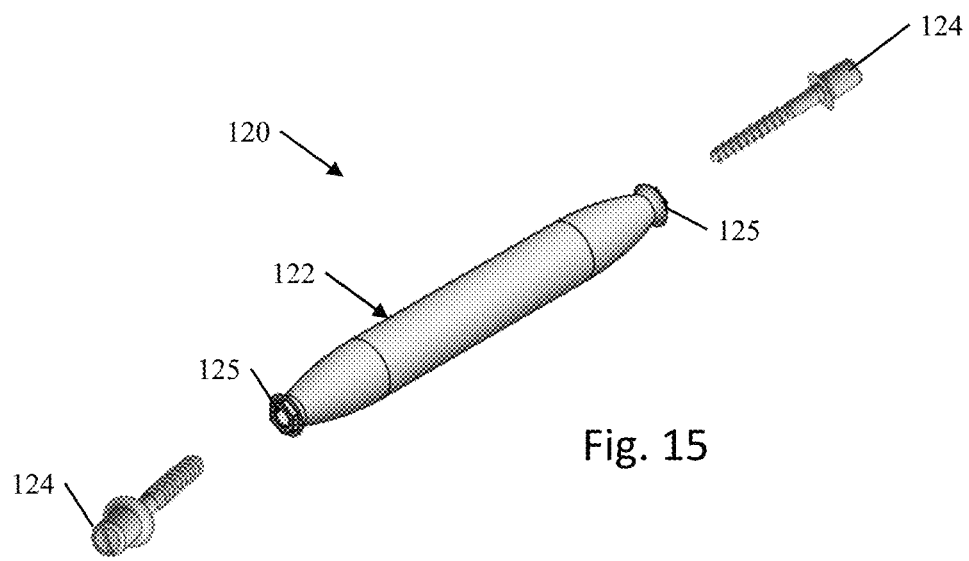
FIG. 15 is an exploded view of a handle assembly of the present invention.

Referring to FIGS. 11 and 12, each support pin 124 is configured to engage with a wash tank 300 of a washing machine and/or to engage with a partition 310 positioned therein. In this way, the support pins 124 are configured to support the basket assembly 100 in a use position. In some embodiments, the basket assembly 100 is free to slide fore and aft on the support pins 124, thereby enabling a user to reposition the basket assembly during or after a collection process, such as to assist with removal of the basket assembly following the collection process. In some embodiments, the basket assembly defines one or more top opening 117 so as to facilitate visibility into the interior area 150 of the basket assembly and/or to facilitate removal of items from the interior area 150 after removal of the basket assembly from the wash tank.

Still referring to FIG. 12, the first 112 and second 114 side walls of the basket body 110 are parallel (or nearly parallel) with each other such that the basket body is void (or nearly void) of draft angles. In this way, the basket assembly 100 can be positioned close to a respective wash tank side wall and/or close to a partition, as applicable. In this way, gaps on either side of the basket during operation are eliminated or otherwise minimized.

Figure 16:
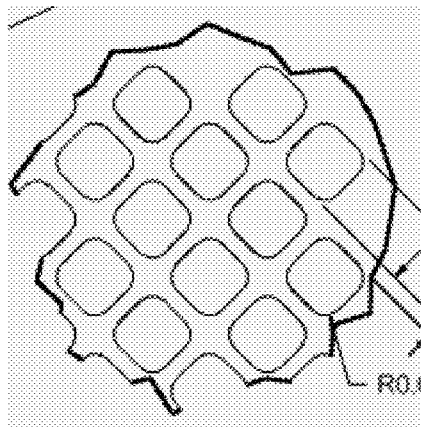
FIG. 16 is a partial view, shown in an enlarged scale, of a perforation pattern of a molded basket body of the present invention.
Figure 17:
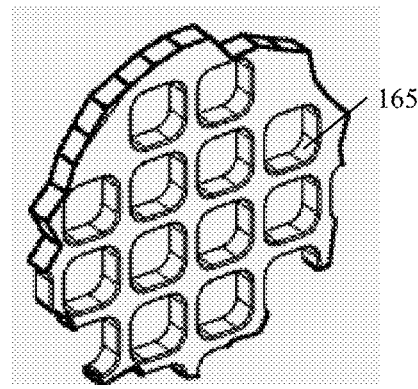
FIG. 17 is a partial perspective view, shown in an enlarged scale, of a perforation pattern of a molded basket body of the present invention.

Some basket bodies 110 of the present invention utilize improved perforation shapes and patterns to facilitate improved fluid flow and item retention. In some embodiments, perforation holes are shaped to allow the maximum cross-sectional area between holes so as to increase durability and impact resistance within the perforation pattern. Referring to FIGS. 16 and 17, some perforations are square with rounded corners. In some such embodiments, the width of each perforation is about 0.25 inches. In some embodiments, the width of each perforation is 0.281 inches. In some embodiments, the radius of each corner is about 0.1 inches. In some embodiments, the radius of each corner is 0.072 inches.

In some embodiments, the perforations are aligned in rows and columns so as to form a grid-like pattern, thereby forming a lattice-type structure of bands of material extending between adjacent rows and columns. In some such embodiments, each band of material is approximately 0.1 inches wide. In some embodiments, each band of material is 0.072 inches wide.

Figure 18:
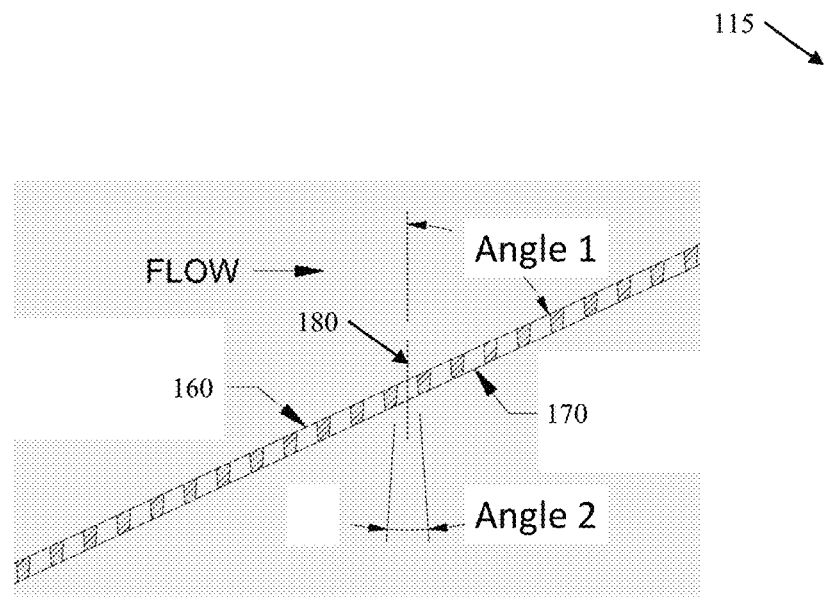
FIG. 18 is a partial sectional view of a perforated wall of a molded basket body of the present invention.

Referring to FIG. 18, each perforated wall defines opposed primary 160 and secondary 170 filtering surfaces, the primary filtering surface 160 being the inner surface of such wall and the secondary filtering surface 170 being the outer surface of such wall, a centerline 180 of each perforation extending through primary and secondary planes associated with respective primary 160 and secondary 170 surfaces. In some embodiments, one or more perforation is angled relative to its primary surface such that the centerline of such perforation is angled relative to the respective primary plane. In some such embodiments, the angle is less than 65 degrees. In some embodiments, the associated wall is angled and the centerline of the perforation is vertical.

Referring to FIGS. 17 and 18, each perforation is defined by opposed first and second openings and a plurality of perimeter surfaces 165 extending therebetween, the first opening being defined by a primary surface 160 and the second opening being defined by a secondary surface 170. In some such embodiments, each opening is square with rounded corners such that the perimeter surfaces 165 for each perforation includes four planar perimeter surfaces and four curved perimeter surfaces. In some embodiments, at least one of the perimeter surfaces is tapered such that a second opening is larger than a respective first opening. In some such embodiments, the at least one tapered surface is tapered by four degrees such that a respective plane or centerline associated with such tapered surface is angled four degrees from the centerline of the perforation. In some embodiments, each of the perimeter surfaces is tapered. In some such embodiments, each surface is tapered by four degrees such that a respective plane or centerline associated with such tapered surface is angled four degrees from the centerline of the perforation. In this way, fluid flow and item retention is improved, flow decreases during operation are eliminated or otherwise reduced, and cleaning after operation is facilitated or unnecessary.

The present invention also includes a method of making a basket assembly 100. In some embodiments, the method includes forming a basket body from a resilient material, such as a polysulfone material. In some embodiments, the material tolerates very small draft angles, has high impact strength, resists an array of extremely aggressive sanitizing chemicals that are present in the commercial kitchen environment, and is food safe. In some embodiments, the material is injected into a mold for forming. In some such embodiments, the mold includes one or more collapsible (or otherwise retractable) plugs that are moveable from a deployed configuration to a retracted configuration. In the deployed configuration, the plug fills part of a void of the mold so as to facilitate forming the basket body with perforations and zero (or virtually zero) draft angle. In some embodiments, the plug is moved to the retracted configuration so as to facilitate removal of the molded basket body from the mold.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

The invention claimed is:

1. A basket assembly, the basket assembly comprising:
    a basket body including opposing first and second side walls, wherein said first and second side walls are parallel; and
    a plurality of body walls extending between said first and second side walls,
        thereby defining an interior area,
        wherein the plurality of body walls includes:
            a rear wall extending along a rear edge of each side wall;
            an intermediate angled wall extending from a bottom edge of the rear wall;
            a bottom wall extending from a front edge of the intermediate angled wall; and
            a front wall extending from the bottom wall towards a front edge of each side wall; and
    a plurality of handle assemblies, each handle assembly extending between first and second side walls and spaced apart by a first distance,
    wherein each handle assembly comprises a handle member having proximal and distal ends, each end of the handle member defining an engagement feature,
    wherein each said engagement feature comprises a lip and a boss extending therefrom, wherein said lip of each engagement feature is configured to engage with an inner surface of a respective side wall, and
    wherein each handle assembly is keyed to one or more side wall, thereby preventing or otherwise inhibiting rotation of the handle assembly.

2. The basket assembly of claim 1, wherein the plurality of body walls include perforations, thereby allowing fluid to flow out of the interior area of the basket assembly.

3. The basket assembly of claim 2, the front wall is angled in an upward direction and configured to retain items within the interior area.

4. The basket assembly of claim 2, wherein the rear wall, intermediate angled wall, and bottom wall define opposed primary and secondary filtering surfaces, a centerline of each perforation extending through primary and secondary planes associated with the respective primary and secondary filtering surfaces.

5. The basket assembly of claim 4, where one or more of said perforations is angled relative to the primary surface plane of its respective body wall such that said centerline of such perforation is angled relative to the respective primary surface plane.

6. The basket assembly of claim 5, wherein the angle between the centerline of the perforation and the primary surface plane of the respective body wall is less than 65 degrees.

7. The basket assembly of claim 2, wherein each perforation is square with rounded corners.

8. The basket assembly of claim 7, wherein a second end of each perforation is wider than a first end of each perforation.

9. The basket assembly of claim 1, where said boss of each engagement feature is configured to be received by a respective engagement aperture of a respective side wall.

10. The basket assembly of claim 9, where said engagement aperture and said boss define corresponding shapes, thereby facilitating keying of the handle assembly to the respective side wall.

* * * * *